April 9, 1968 SHINE YASUOKA ET AL 3,377,535
METHOD AND APPARATUS FOR CONTROLLING SPEED OF
A DC MOTOR OF BRUSHLESS TYPE
Filed Aug. 23, 1966
5 Sheets-Sheet 1
Fig. 1
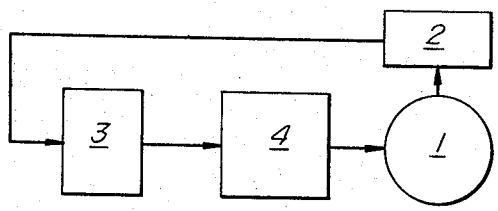
Fig. 2
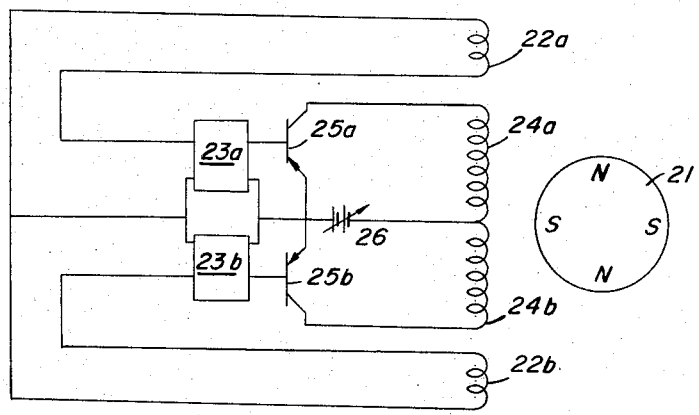
Fig. 3(a)  Fig. 3(b)  Fig. 3(c)
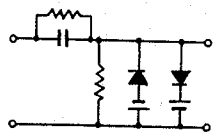 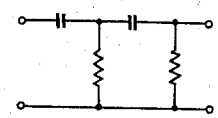 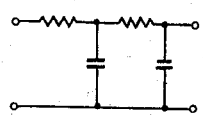
Fig. 3(d)  Fig. 3(e)  Fig. 3(f)
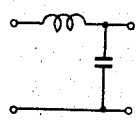 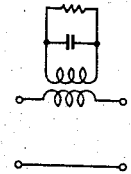 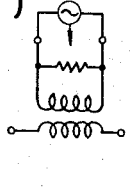

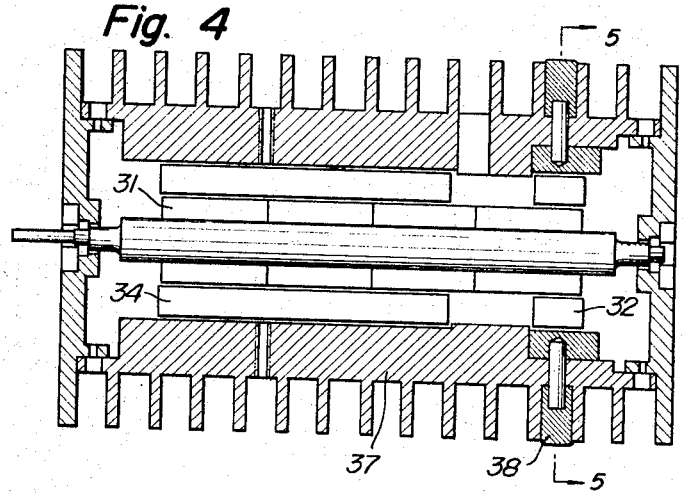
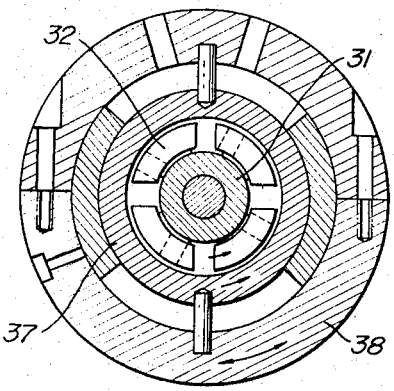
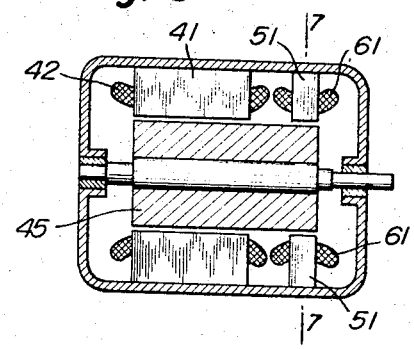
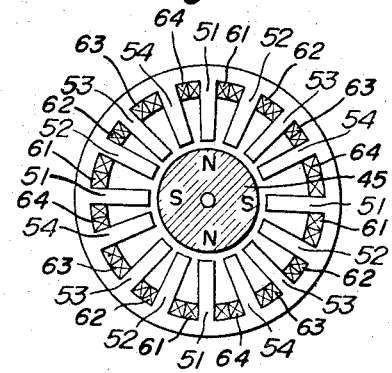

United States Patent Office
3,377,535
Patented Apr. 9, 1968

3,377,535
METHOD AND APPARATUS FOR CONTROLLING SPEED OF A DC MOTOR OF BRUSHLESS TYPE
Shine Yasuoka, Toyonaka-shi, Yutaka Tanaka, Kobe, and Sakon Nagasaki, Daito-shi, Japan, assignors to Matsushita Electric Industrial Co., Ltd., Osaka, Japan, a corporation of Japan
Continuation-in-part of application Ser. No. 313,473, Oct. 3, 1963. This application Aug. 23, 1966, Ser. No. 574,402
Claims priority, application Japan, Oct. 25, 1962, 37/47,721, 37/47,722; Dec. 28, 1962, 37/80,679
7 Claims. (Cl. 318—138)

ABSTRACT OF THE DISCLOSURE

A speed control for a brushless DC motor having a permanent magent rotor, a control coil, a drive coil, a switching circuit and means for adjusting the phase difference between the drive current and magnetic flux of the rotor in accordance with either the motor speed or power source voltage.

---

The present application is a continuation-in-part of our earlier filed application Ser. No. 313,473, filed Oct. 3, 1963, now abandoned.

The present invention relates to a method and apparatus for controlling the speed of a DC motor of a brushless type wherein a stator coil comprises coils included in a switching circuit, using a switching element such as a transistor or semiconductor having a control electrode with the latter coils being used for a driving coil and a control coil, respectively.

It is an object of the present invention to provide an apparatus for controlling the speed of a brushless DC motor comprising a driving coil and a control coil included in a switching circuit using a switching element and a permanent magnet rotor with the switching operation of the switching circuit being controlled by a voltage induced across the control coil by the rotation of the rotor. This switching action produces electromagnetic forces between a magnetic field produced by the magnetizing current flowing through the driving coil and the permanent magnet rotor to further continuously drive the rotor. The method comprises adjusting electrically or mechanically the phase difference between the driving current flowing through the driving coil and the magnetic flux of the rotor, interlinking with the control coil, in accordance with the rotating speed of the motor or voltage of the power supply source, thereby building up or speeding up of such a motor being controlled smoothly, and further rotational speed of such a motor being controlled as desired in exceedingly high speed.

The means for accomplishing the foregoing objects and other advantages, which will be apparent to those skilled in the art, are set forth in the following specification and claims and are illustrated in the accompanying drawings dealing with a basic embodiment of the present invention.

Reference is made now to the drawings in which:

FIG. 1 shows a basic block diagram of an embodiment according to the present invention;

FIG. 2 shows a basic circuit diagram embodying the present invention;

Figure 8:
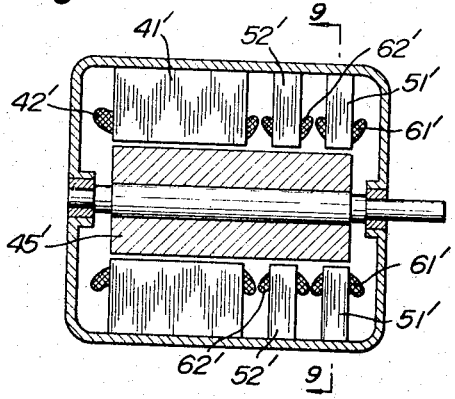
Figure 9:
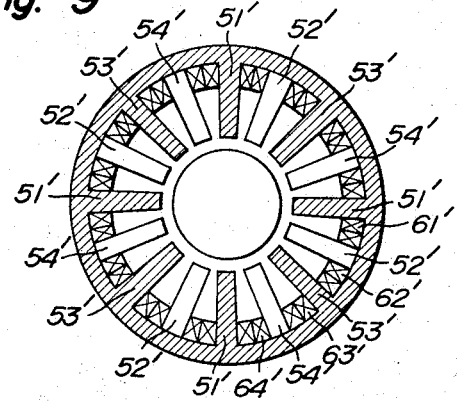
Figure 10:
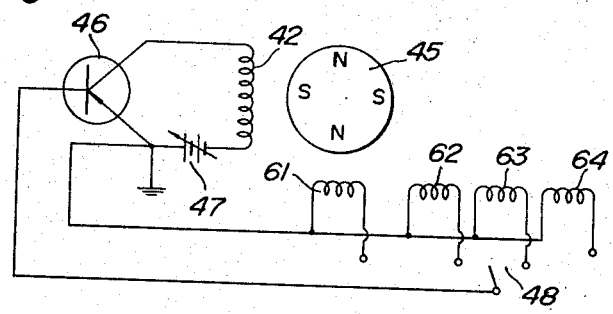
Figure 11:
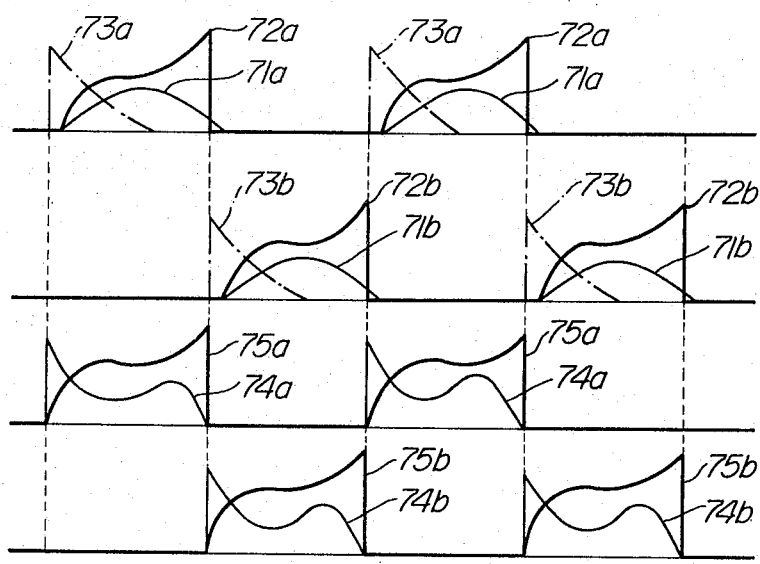
Figure 12:
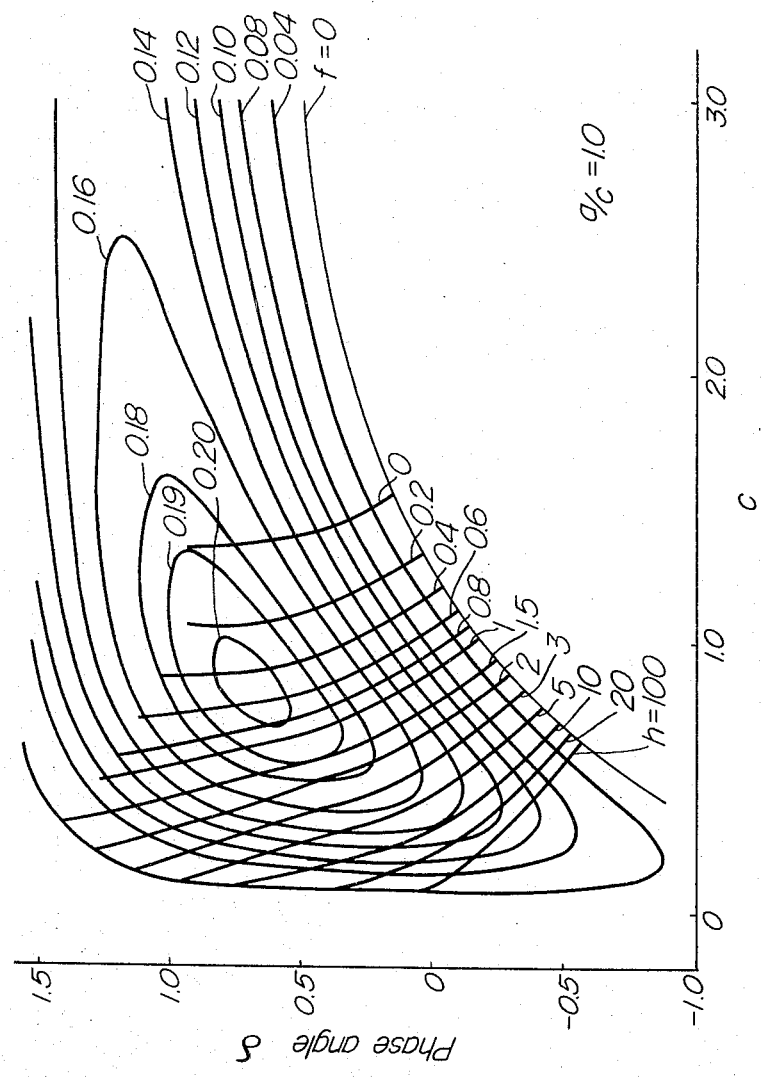

FIGS. 3(a) to (f) are circuit diagrams of various electric phase shifters adapted to be used in the apparatus embodying the present invention;

FIG. 4 is a longitudinal section of a brushless DC motor provided with a mechanical phase shifter embodying the present invention;

FIG. 5 is a cross-sectional view taken along line 5—5 of the phase shifter shown in FIG. 4;

FIG. 6 is a longitudinal sectional view of another brushless DC motor embodying the present invention;

FIG. 7 is a cross-sectional view of the apparatus shown in FIG. 6 taken along line 7—7;

FIG. 8 is a longitudinal sectional view of another brushless DC motor embodying the present invention;

FIG. 9 is a cross-sectional view of the apparatus shown in FIG. 8 taken along line 9—9;

FIG. 10 is an electrical wiring diagram of the DC motor shown in FIGS. 6 to 9;

FIG. 11 shows basic wave forms of the current of the DC motor shown in FIGS. 6 to 9; and FIG. 12 shows chracteristic curves of the DC motor shown in FIGS. 6 to 9.

In FIG. 1, which illustrates the basic principle of the present invention with a block diagram, voltage induced across a control coil 2 by rotation of a permanent magnet rotor 1 is adjusted in phase by a phase shifter 3. Current flowing through a driving coil 4 is controlled by applying the control voltage, adjusted in phase, to a switching element. The field poles are magnetized by this driving current to continuously drive the permanent magnet rotor 1. The circuit shown in FIG. 1 is an example of the inventive apparatus including a phase shifter which is illustrated in more detail in FIG. 2.

In FIG. 2, which shows a basic electrical circuit embodying the present invention, reference numeral 21 represents a permanent magnetic rotor; each of the control coils 22a and 22b is connected to each of the phase shifters 23a and 23b, respectively; each end of the driving coils 24a and 24b is connected through the collector and base of each transistor 25a and 25b to each one of the terminals of the phase shifter 23a and 23b, respectively. Both of the other ends of the driving coils 24a and 24b are connected through DC power sources, 26a and 26b to the other terminals of the phase shifters 23a and 23b. Both of the emmiters of the transistors are connected to the junction of the power sources 26a and 26b and the phase shifters 23a and 23b.

First, a basic principle of operation of an electric circuit as shown in FIG. 2 will be described. It should be assumed that the electric circuit does not include phase shifters 23a and 23b therein; namely, the control coils 22a and 22b are connected directly across the base and the emitter of each of the transistors 25a and 25b, respectively. In this imaginary or assumed circuit, when the rotor 21 is driven by some means to start, voltages are induced across the control coils 22a and 22b by rotation of the rotor 21 which causes a variation of magnetic flux interlinking with the control coils 22a and 22b. Due to the induced voltages across the control coils 22a and 22b, currents flow through the bases of the transistors 25a and 25b, respectively, as shown by 71a and 71b in FIG. 11. Then the transistors 25a and 25b conduct current at each half cycle, respectively, and subsequently currents flow through the driving coils 24a and 24b, respectively, as shown by 72a and 72b in FIG. 11. As seen from the drawings, each value of current 72a and 72b flowing through the driving coils becomes zero, respectively, before each corresponding value of currents 71a and 71b becomes zero, because the saturation condition that $h_{FE} \times i_b \geq i_c$, where $h_{FE}$ is a factor of DC amplification of transistors 25a and 25b, $i_b$ is the instantaneous value of current 71a or 71b and $i_c$ is the instantaneous value of current 72a or 72b, becomes unsatisfied by the transistor 25a or 25b before the value of current 71a or 71b becomes zero.

If the control coils 22a and 22b are magnetically coupled to the driving coils 24a and 24b, voltages are induced across the control coils 22a and 22b, respectively, by the instantaneous change or sudden cutoff of current 72a or 72b, effecting the current flow through the base sides of the transistors 25a and 25b as shown by 73a and 73b in FIG. 11. Thus, the currents, as shown by 74a and 74b in FIG. 11, finally flow through the bases of the transistors and the currents, as shown in 75a and 75b in FIG. 11, flow through the collectors of the transistors, both being the sum of currents induced by the change of the flux interlinkage by the rotation of the rotor and the currents induced by the sudden cutoff of conductivity of the transistors.

It will be seen that the collector currents 75a and 75b of the transistors will lead in phase as each flux of the permanent magnet of the rotor is in phase, respectively, with the currents 71a and 71b. This is a characteristic of a brushless DC motor in which control coils are employed as a phase detector of the rotor, semiconductor elements, provided with control grids such as transistors, are employed as current rectifying elements and the control coils and driving coils are magnetically coupled. This characteristic has not been exhibited in prior or conventional motors.

In the following description, E denotes the voltage of the power source in volts; S denotes the number of poles of the rotor; $\phi$ denotes the maximum flux interlinkage in webers per turn of the stator coil when the flux distribution of the rotor is assumed to be a sinusoidal form; $n_1$ denotes the number of turns of either of the driving coils 24a or 24b; $R_1$ denotes the collector resistance, including the internal resistance of the transistor in ohms; $L_1$ denotes the inductance of either of the driving coils 24a or 24b in henrys; $R_2$ denotes the resistance of either of the closed base circuits of the transistors in ohms; $n_2$ denotes the number of turns of either of the control coils 22a or 22b; $L_2$ denotes the inductance of either of the control coils 22a or 22b in henrys; $\omega$ denotes the angular velocity of rotation of the motor; and $\delta$ denotes the phase difference between the current flowing through the driving coil and the flux of the permanent magnet rotor, by which the former is induced, in radians.

FIG. 12 illustrates one example of the characteristic curves of the motor of the present invention wherein:

$$C = \frac{S \cdot \omega \cdot n_1 \cdot \phi}{2E}$$

$$a = \frac{S \omega L_1}{2R_1}$$

$$h = h_{FE} \cdot \frac{n_2}{n_1} \cdot \frac{R_1}{R_2}$$

$$f = \frac{W_i}{\frac{E^2}{R}}$$

where $W_i$ is the mechanical output of the motor in watts. Since $$\frac{a}{c} = \frac{L_1}{R_1} \cdot \frac{E}{n_1 \phi}$$

the value of $a/c$ is a constant defined by the motor while the voltage of the power source E is constant.

The value $c$ is dependent on $\omega$ defined by the motor and at E constant, and therefore, the abscissa of the curve shown in FIG. 12 may be considered as corresponding to the rotational speed of the motor; $f$ represents the mechanical output $W_1$ of a motor if the source voltage is fixed at a constant value and $R_1$ is constant or is fixed for a certain motor.

As can be seen from FIG. 12, it is necessary to reduce the value of $h$ for the purpose of obtaining high rotational speed of a motor. However, the characteristic of a motor will become inferior at low rotational speeds when the value of $h$ is reduced. Therefore, the value of $h$ must be varied subsequently in accordance with the rotational speed of the motor. However, a high efficiency speed control can be obtained in the following manner at the constant value of $h$.

The phase relation between the phase of the flux of the permanent magnet rotor and the phase of the current flowing through the driving coils varies according to the variation or change in the phase of which the cutoff condition $h_{FE} \geq i_c$ is satisfied at a leading position of phase. As a result, the value of $\delta$ increases, also the value of $f$ increases causing an increased rotational speed of the motor. However, when the value of $h$ is reduced, for example, to $h=0.6$, to obtain a high rotational speed of the motor, there will appear substantially zero output of the motor at low speeds, and as a result, the motor will stop building up speed after starting.

As mentioned above, however, by providing a phase shifter to compensate the increase of value of $\delta$ at low rotating speed of the motor, while the value of $h$ is maintained at a reduced value thus reducing the apparent value of $\delta$ at low rotational speed of the motor, and reducing the rate of compensation by a phase shifter according to the increase of the rotational speed of the motor, the motor can be driven at high efficiency overall speed ranges.

It is not effective to drive the motor to start under the same conditions under which it is desirable to drive the motor for high speed. The high efficiency speed control can be obtained by driving the motor subsequently at optimum conditions varying according to the speed of the motor from starting to high speed. The phase shifters 23a and 23b, shown in FIG. 2, are employed for the purpose above explained. The phase shifters may be electric circuits or may comprise mechanical phase shifting apparatus.

For the purpose of shifting the phase electrically, typical suitable phase shifting circuits have been shown in FIGS. 3(a) to $f$ and may be connected to the circuit shown in FIG. 2. Among circuits of FIGS. 3(a) and (b) are examples of phase advancing circuits, and (c) and (d) are phase retarding circuits. The amount of phase shift can be varied by varying the values of the parameters constituting the circuit. In addition, the phase shift may be formed as shown in FIGS. 3(e) and (f) by coupling a transformer to the primary of secondary winding of which is connected a resistor or capacitor. Furthermore, as shown in FIG. 3(f), when a separate control signal is applied across the secondary winding of the transformer to combine the separate signal with the signal fed from the control coil to form a new signal and the motor is driven by controlling the switching element with the combined signal, speed control of the motor is accomplished by varying the phase difference between the combined signal and the signal fed from the control coil by means of the external control signal.

In FIGS. 4 and 5, which illustrate mechanical phase shifters, the reference numeral 31 denotes a permanent magnet rotor. The control coil 38 is rotatably mounted on the interface of an outer frame 37 and a driving coil stator 34 is mounted on the outer frame 37. When the control coil 32 is rotated as shown by arrow M by means of a handle 38, the control coil is moved in respect to the driving coil and hence a phase difference beween the driving currents flowing through the driving coil and the magnetic flux of the rotor interlinking with the driving coil is adjusted.

Another embodiment of the present invention will now be described in conjunction with FIGS. 6 to 10. Referring to FIGS. 6 and 7, main field poles 41 have a driving coil 42 wound thereabout and control coils 61, 62, 63, and 64 are wound around the control poles 51, 52, 53, and 54, respectively. A permanent magnet rotor 45 is rotated in facing relation with the main field poles 41 and the control poles 51, 52, 53, and 54. The driving coil 42 is connected through a power source 47 between the emitter and collector of a transistor 46 and the control coils 61, 62, 63, and 64 are connected through a switch 48 between the base and the emitter of transistor 46 to constitute a switching circuit for the transistor, as shown in FIG. 10.

Any number (p) of main field poles may be provided and for p main field poles mp (m being an arbitrary number) control poles may be formed. In the above example, p=4 and m=4 were selected.

In such a motor, when the permanent magnet rotor 45 is rotated, voltage is induced across the control coils 61, 62, 63, and 64 with the voltage being applied to the base of the transistor 46 to control the switching action. Thus, the current flowing through the driving coil 42 is controlled and the driving current magnetizes the main field poles 41 to continuously rotate the rotor 45. As shown in the rotational speed characteristics of FIG. 12, in such a motor, when the power source voltage is maintained constant, the rotational speed is widely varied by the phase difference between the driving currents flowing through the driving coils and the magnetic flux of the rotor interlinking with the driving coil.

With the above-mentioned embodiment, the speed control is effected very efficiently by providing mp control coils spacially shifted in phase in respect to the main field poles, converting the connection of the control coils and adjusting in phase the driving current flowing through the driving coil and the control current flowing through the control coils.

Still another embodiment according to the present invention is illustrated in FIGS. 8 and 9 in which control poles 51', 53', and 54' are distributed in two blocks arranged axially of a rotor 45'. The operation of this embodiment is similar to the operation of that shown in FIGS. 6 and 7.

Thus, for the embodiment shown in FIGS. 6 to 10, which are simple in both construction and operation, in a brushless DC motor comprising a driivng coil and control coils included in a switching circuit using a switching element and permanent magnet rotor, high speed control can be efficiently effected by providing mp control coils shifted spatially in phase in respect to p main field poles, connecting the control coils to a control terminal of the switching circuit through a switch, whereby a suitable one of said control coils will be selectively connected through the switching action of a switch to vary the phase difference between driving current flowing through the driving coil and magnetic flux of the rotor interlinking with the driving coil in order to change the rotational speed of the rotor.

As seen from the foregoing description, according to the present invention, in a DC motor of brushless type comprising a driving coil or driving coils and control coils included in a switching circuit using a switching element and a permanent magnet rotor, the motor can be operated wth high efficiency at either high speeds or at low speeds using a relatively simple device, by adjusting the phase difference between the driving current flowing through the driving coil and the magnetic flux of the rotor interlinking the driving coil or coils by means of an electric or mechanical phase shifter or shifters in accordance with the motor speed and voltage of a power source.

The invention may be embodied in other specific forms without departing from the spirit or central characteristics thereof. The present embodiment is therefore to be considered in all respects as illustrative and not restrictive, the scope of the invention being indicated by the appended claims rather than the foregoing description and all changes which come within the meaning and range of equivalency of the claims are therefore to be embraced herein.

What is claimed is:

1. A device for making the rotation of a brushless DC motor efficient and stable comprising a permanent magnet rotor, a stator coil composed of at least one driving coil and control coil, a power source connected to said driving coil, a switching circuit having a switching element, said stator coil forming a part of said switching circuit, means for controlling the speed of said motor within a range of speed comprising means for adjusting the phase difference between the driving current flowing through said driving coil and the magnetic flux of said rotor interlinking with said driving coil selectively in accordance with the speed of said motor and the voltage of said power source for said motor thereby operating said motor at high efficiency over all speed ranges of said motor.

2. A device for making the rotation of a brushless DC motor efficient and stable according to claim 1 in which said means for adjusting the phase relation between said current flowing through the driving coil and the magnetic flux of said rotor comprises mechanical means for changing the relative position of said driving coil with respect to said control coil thereby driving said motor at high efficiency over all speed ranges of said motor.

3. A device for making the rotation of a brushless DC motor efficient and stable according to claim 1 in which a plurality of driving coils and control coils are provided, the latter being disposed in different relative positions with reference to said driving coils, means for adjusting the phase difference between the current flowing through said driving coils and the magnetic flux interlinking said driving coils in accordance with the speed of said motor and the voltage of said power source by selectively connecting suitable control coils in said switching circuit thereby driving said motor at high efficiency over all speed ranges of said motor.

4. A device for making the rotation of a brushless DC motor efficient and stable according to claim 1 comprising interposing a phase-shifting circuit between said control coil and said driving coil, means for adjusting the phase relation between the current flowing through said driving coil and said magnetic flux of said rotor interlinking with said driving coil in accordance with the speed of said motor and the voltage of said power source to said motor.

5. A device for making the rotation of a brushless DC motor efficient and stable comprising a driving coil and a control coil, a switching circuit including a switching circuit including a switching element and said driving coil and said control coil, a permanent magnet rotor, a power source connected to said driving coil, means for controlling the speed of said motor within a range of speeds comprising means to control the switching operation of said switching circuit according to the voltage induced across the control coil by rotation of the rotor, said switching action producing an electromagnetic force between the magnetic field produced by the magnetizing current flowing through the driving coil and the magnetic field of said permanent magnet to further continuously drive said rotor, and means for adjusting the phase difference between the driving current flowing through the driving coil and the magnetic flux of the rotor interlinking with the driving coil thereby controlling the rotating speed of said motor as desired.

6. A device for making the rotation of a brushless DC motor efficient and stable comprising a permanent magnet rotor, a control coil located adjacent said rotor, phase shifting means connected to said control coil, a driving coil connected to said phase shifter and located adjacent said permanent magnet, a power source, means for controlling the speed of said motor within a range of speeds comprising switching means to supply a control voltage from said power source through said driving coil, said driving coil being magnetized to continuously drive the permanent magnet rotor, said phase shifting means adjusting the phases of the current flowing through said driving coil and said control coil to thereby control the rotational speed of said motor.

7. A device for making the rotation of a brushless DC motor efficient and stable comprising a permanent magnet rotor, at least one control coil located adjacent said rotor, at least one phase shifting means connected to each said control coil, at least one driving coil positioned adjacent said rotor, means for controlling the speed of said motor within a range of speeds comprising switching means, said phase shifters being connected to said driving coils through said switching means, a power source connected to said driving coils, said switching means being controlled by the voltage induced across the control coils by rotation of the rotor said switching means being actuated to pass current through said phase shifters whereby the phase difference between the current flowing through the driving coil and the magnetic flux of the rotor interlinking with said driving coil in order to produce the desired speed control of said motor throughout its start and running operations.

References Cited

UNITED STATES PATENTS

| | | | |
|---|---|---|---|
| 2,814,769 | 11/1957 | Williams | 318—138 X |
| 3,050,671 | 8/1962 | Moller | 318—138 X |
| 3,134,220 | 5/1964 | Meisner | 318—138 X |
| 3,067,370 | 12/1962 | Quittner | 318—138 X |

ORIS L. RADER, *Primary Examiner.*

G. SIMMONS, *Assistant Examiner.*